United States Patent
Lin

(10) Patent No.: US 10,306,448 B2
(45) Date of Patent: *May 28, 2019

(54) SYSTEM AND METHOD FOR REQUESTING AND PROVIDING LOCATION-BASED ASSISTANCE

(71) Applicant: Hung Yuan Lin, New Taipei (TW)

(72) Inventor: Hung Yuan Lin, New Taipei (TW)

(73) Assignees: Hung Yuan Lin, New Taipei (TW); Jia-Cing Lin, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,768

(22) Filed: Sep. 29, 2016

(65) Prior Publication Data

US 2017/0070874 A1    Mar. 9, 2017

Related U.S. Application Data

(63) Continuation of application No. 13/071,665, filed on Mar. 25, 2011, now Pat. No. 9,485,642.

(30) Foreign Application Priority Data

Mar. 26, 2010 (TW) ............................... 99109162 A
Mar. 26, 2010 (TW) ............................... 99205370 U

(51) Int. Cl.
*G06F 15/16* (2006.01)
*H04W 4/90* (2018.01)
(Continued)

(52) U.S. Cl.
CPC ............. *H04W 4/90* (2018.02); *G06Q 10/10* (2013.01); *H04L 51/08* (2013.01); *H04L 51/32* (2013.01);
(Continued)

(58) Field of Classification Search
CPC ......... G06Q 10/10; H04L 51/08; H04L 51/32; H04L 67/146; H04M 1/72541;
(Continued)

(56) References Cited

U.S. PATENT DOCUMENTS 7,783,305 B2    8/2010  Ross
7,818,588 B2 *  10/2010 Duri ................... G06F 21/6245
                                                            709/207
(Continued)

FOREIGN PATENT DOCUMENTS

TW        200301432       7/2003
TW        I241799         10/2005
TW        200742833       11/2007

*Primary Examiner* — Phuoc H Nguyen
(74) *Attorney, Agent, or Firm* — Bacon & Thomas, PLLC

(57) ABSTRACT

The present invention provides a method for requesting location-based assistance executed on a mobile device of an assistance requester, and a method and system for providing location-based assistance executed on a server of a joint assistance service provider. The present invention integrates mobile positioning and telecommunications technologies to provide assistance provision information. In the present invention, an assistance request module of the mobile device is activated for execution to locate the assistance requester; assistance request information containing the assistance requester's location information is transmitted to the server of the joint assistance service provider. Then, the mobile device is connected to a social networking website or an assistance provider via the server of the joint assistance service provider to receive real-time assistance provision information. The present invention improves conventional assistance request methods as well as assistance provision timings. Also, the assistance request information, containing the assistance requester's location information, is analyzed to provide more accurate assistance-related data to the (Continued)

assistance provider. Therefore, the present invention allows the efficiency of providing assistance to be improved.

21 Claims, 12 Drawing Sheets

(51) Int. Cl.
*G06Q 10/10* (2012.01)
*H04M 1/725* (2006.01)
*H04W 4/02* (2018.01)
*H04L 12/58* (2006.01)
*H04L 29/08* (2006.01)
*H04W 8/24* (2009.01)

(52) U.S. Cl.
CPC ...... *H04L 67/146* (2013.01); *H04M 1/72541* (2013.01); *H04W 4/02* (2013.01); *H04M 1/72561* (2013.01); *H04M 2242/04* (2013.01); *H04M 2242/30* (2013.01); *H04W 8/24* (2013.01)

(58) Field of Classification Search
CPC ......... H04M 1/72561; H04M 2242/04; H04M 2242/30; H04W 4/02; H04W 4/90; H04W 8/24
USPC .......................................... 709/227
See application file for complete search history.

(56) References Cited

U.S. PATENT DOCUMENTS

| | | |
|---|---|---|
| 8,069,202 B1 * | 11/2011 | Cona ................. G01C 21/3415 340/8.1 |
| 8,244,832 B1 | 8/2012 | McGuire |
| 2002/0171581 A1 | 11/2002 | Sheynblat et al. |
| 2003/0132298 A1 * | 7/2003 | Swartz .................. G06K 17/00 235/472.02 |
| 2004/0029567 A1 * | 2/2004 | Timmins ............ H04M 3/4931 455/412.1 |
| 2004/0088345 A1 | 5/2004 | Zellner |
| 2004/0139156 A1 | 7/2004 | Matthews |
| 2004/0243664 A1 | 12/2004 | Horstemeyer |
| 2005/0015501 A1 | 1/2005 | Kaplan |
| 2005/0227666 A1 | 10/2005 | Cheng |
| 2006/0287783 A1 * | 12/2006 | Walker .................. G06Q 30/02 701/31.4 |
| 2007/0038516 A1 | 2/2007 | Apple et al. |
| 2007/0072591 A1 * | 3/2007 | McGary ................. H04W 4/02 455/414.1 |
| 2007/0168537 A1 | 7/2007 | Misra |
| 2008/0028038 A1 | 1/2008 | Kaplan |
| 2008/0227473 A1 | 9/2008 | Haney |
| 2008/0263446 A1 * | 10/2008 | Altberg ................. G06Q 30/02 715/706 |
| 2009/0182885 A1 | 7/2009 | Sang et al. |
| 2009/0240561 A1 * | 9/2009 | Altberg ................. G06Q 10/10 705/7.29 |
| 2009/0306935 A1 * | 12/2009 | Hamilton, II ........... A63F 13/12 702/184 |
| 2010/0124900 A1 | 5/2010 | Lui et al. |

* cited by examiner

SYSTEM AND METHOD FOR REQUESTING AND PROVIDING LOCATION-BASED ASSISTANCE

BACKGROUND OF THE INVENTION

Field of the Invention

The present invention relates to a system and a method for providing location-based assistance, and more particularly, to a system and a method for providing location-based assistance that uses a mobile device to connect to a website server.

Description of the Related Art

Nowadays, cell phones are so popular that nearly everyone owns one on average. To some people, a cell phone is even an indispensable article in everyday life that they need to carry around all the time. On the other hand, the development of location-based services has been growing rapidly, since more and more people are using their cell phones to access the Internet, while cell phones featuring mobile positioning functions are gaining popularity. Location-based services allow users to acquire the service they need based on where they are. For example, a user heading for a certain location can first locate himself/herself using a mobile device capable of mobile positioning, and then retrieve map information from a service provider.

The use of location-based services covers a wide range. Taiwan Patent Application Publication No. 200301432 relates to providing content and information according to a user's location information sent from the mobile device. Taiwan Patent Application Publication No. 1241799 relates to a service system that automatically selects and provides information. Taiwan Patent Application Publication No. 200742833 relates to a method that automatically transforms the content format so that it can be identified and read by nearly all of the mobile devices. Moreover, location-based services have been used to provide emergency assistance, like the "Emergency Report e-Platform" launched in Taiwan. When an assistance requester uses a cell phone to dial 911, the cell phone will be located by nearby cell sites, which also records the assistance requester's location information at the same.

However, the foregoing methods all require cell sites to record and transmit mobile device users' location information. Thus, the positioning accuracy is more prone to be affected by the amount and density of cell sites. In areas where cell-site density is sparse, positioning result would be less accurate. Besides, the foregoing methods only store the assistance requester's location information but fail to utilize it, and the assistance providers are rather limited.

In addition, there are some emergency situations where an assistance requester cannot speak to an assistance provider, like in a ransom case. The service provider may thus fail the opportunity to give first aid for not knowing the assistance requester's needs. Moreover, the assistance requester's location may constantly change; recording only the initial location cannot help the subsequent assistance process. For the reasons stated above, it is necessary to develop a system and method that is able to digitally analyze the information about the assistance request and requester's location, and that is also able to do a planning and to release the information, so that the efficiency of providing assistance can be improved.

SUMMARY OF THE INVENTION

The present invention aims to provide a method for requesting location-based assistance, and a method and system for providing location-based assistance. The present invention integrates mobile positioning and telecommunications technologies to release assistance request information and provide assistance provision information, thereby allowing the whole assistance provision process to be more effective and speedy. The present invention overcomes the above-mentioned drawbacks of a conventional assistance provision process by improving the assistance request method as well as the assistance provision timing. The present invention takes advantage of the popularity of mobile devices. An assistance requester only needs a simple set of keyboard inputs on his/her mobile device to continuously transmit request signals, which contain the requester's location information. In the present invention, the assistance request information, containing the assistance requester's location information, is analyzed to provide more precise assistance-related data to an assistance provider. Therefore, the present invention provides a new method for requesting assistance and can improve the efficiency of providing assistance.

An object of the present invention is to provide a method for requesting location-based assistance executed on a mobile device of an assistance requester. The method includes the following steps: executing an assistance request module to locate an assistance requester, the assistance request module activated via a keyboard of the mobile device; and transmitting assistance request information containing the assistance requester's location information to a server of a joint assistance service provider, the server generating an assistance service list based on the assistance request information.

The method for requesting location-based assistance according to the present invention further includes: transmitting the assistance request information and a dynamic URL link to a social networking website, an instant messaging service, an online discussion site, a bulletin board system (BBS), or a widget, wherein the dynamic URL link enables a user to connect to the server of the joint assistance service provider for obtaining the assistance service list.

The method for requesting location-based assistance according to the present invention further includes: transmitting the assistance request information and a dynamic URL link to a mobile device of an emergency contact person pre-specified by the assistance requester, wherein the dynamic URL link enables the emergency contact person to connect to the server of the joint assistance service provider for obtaining the assistance service list.

The method for requesting location-based assistance according to the present invention further includes: the mobile device being connected via the server of the joint assistance service provider to a social networking website, an instant messaging service, an online discussion site, a bulletin board system (BBS), or a widget to receive real-time assistance provision information.

The method for requesting location-based assistance according to the present invention further includes: determining a method and frequency of transmission according to the assistance requester's settings.

The method for requesting location-based assistance according to the present invention further includes: executing a tracker program in the background to obtain location updates of the assistance requester and transmitting updated assistance request information.

Another object of the present invention is to provide a method for providing location-based assistance used to jointly provide assistance to an assistance requester having a mobile device. The method includes the following steps:

receiving assistance request information containing the assistance requester's location information from the mobile device; analyzing the assistance request information to generate an assistance service list containing assistance-related data which contains the assistance requester's location information; and providing the assistance service list to an assistance provider.

The method for providing location-based assistance according to the present invention further includes: connecting to a social networking website, an instant messaging service, an online discussion site, a bulletin board system (BBS), or a widget to transmit assistance request information thereto.

The method for providing location-based assistance according to the present invention further includes: providing an assistance request dialogue interface for the assistance requester to communicate with a user browsing content of the social networking website, the instant messaging service, the online discussion site, the bulletin board system, or the widget, or for the assistance requester to communicate with the assistance provider.

The method for providing location-based assistance according to the present invention further includes: providing a dynamic URL link to an emergency contact person or a user browsing content of the social networking website, the instant messaging service, the online discussion site, the bulletin board system, or the widget, so that the emergency contact person or the user can connect to a server of a joint assistance service provider to obtain the assistance service list.

In the aforementioned method for providing location-based assistance, the assistance-related data contains maps of the assistance requester's location, route plans for assistance provision, surrounding area map search, or assistance provision information search.

Yet another object of the present invention is to provide a system for providing location-based assistance used to jointly provide assistance to an assistance requester having a mobile device, wherein the system includes a server which comprises: a mobile device connection module receiving assistance request information containing the assistance requester's location information from the mobile device, wherein the assistance requester's location information is obtained by executing an assistance request module of the mobile device; an assistance request information analysis module receiving and analyzing the assistance request information to generate an assistance service list for providing assistance-related data which contains the assistance requester's location information; and an assistance request dialogue management module for an assistance provider to communicate with the assistance requester.

In the aforementioned system for providing location-based assistance, the assistance-related data contains maps of the assistance requester's location, route plans for assistance provision, surrounding area map search, or assistance provision information search.

In the aforementioned system for providing location-based assistance, the server further comprises an external module connection module which connects to a social networking website, an instant messaging service, an online discussion site, a bulletin board system (BBS), or a widget to transmit assistance request information thereto.

In the aforementioned system for providing location-based assistance, the assistance request module of the mobile device is activated for execution by a sequence of keyboard inputs.

In the aforementioned system for providing location-based assistance, the assistance request module of the mobile device is activated for execution by the sequence of keyboard inputs, and the assistance request module transmits the assistance request information containing the assistance requester's location information to the server.

In the aforementioned system for providing location-based assistance, the server provides a dynamic URL link to an emergency contact person or a user browsing content of the social networking website, the instant messaging service, the online discussion site, the bulletin board system, or the widget, so that the emergency contact person or the user can connect to the server to obtain the assistance service list.

In the aforementioned system for providing location-based assistance, the server provides an assistance request dialogue interface for the assistance requester to communicate with a user browsing content of the social networking website, the instant messaging service, the online discussion site, the bulletin board system, or the widget.

In the aforementioned system for providing location-based assistance, the mobile device selects an emergency level of the assistance request information according to the assistance requester's settings and determines a method and frequency of transmitting the assistance request information.

In the aforementioned system for providing location-based assistance, when the assistance request information is of an emergency type, the mobile device executes a tracker program in the background to obtain location updates of the assistance requester and transmits updated assistance request information to the server and an emergency contact person pre-specified by the assistance requester.

In the aforementioned system for providing location-based assistance, the mobile device transmits the assistance request information via a text message to a mobile device of the emergency contact person pre-specified by the assistance requester, the text message containing a dynamic URL link so that the emergency contact person can connect to the server to obtain real-time assistance provision information.

The present invention simplifies the process for requesting assistance and is capable of providing important, useful information to the assistance requester. And after the assistance request information is received, said request information, containing the assistance requester's location information, is analyzed so that more useful information can be provided to the assistance provider and the assistance provision process can be more effective. Moreover, by connecting to a social networking website, instant messaging service, online discussion site, bulletin board system, or widget, the assistance requester's families or friends are able to provide further help or seek other assistance; therefore, the assistance provision efficiency is even increased. Also, in the method for requesting location-based assistance and the system and method for providing location-based assistance according to the present invention, the emergency level of an assistance request can be determined; thus, the present invention can be applied to non-emergency assistance requests as well.

DETAILED DESCRIPTION OF THE PREFERRED EMBODIMENTS

The present invention now will be described more fully hereinafter with reference to the accompanying drawings, in which preferred embodiments of the invention are shown. It is to be understood that all kinds of alterations and changes can be made by those skilled in the art without deviating from the spirit and the scope of the invention. This description is not to be taken in a limiting sense, but is made merely for the purpose of illustrating the general principles of the invention.

Figure 1A:
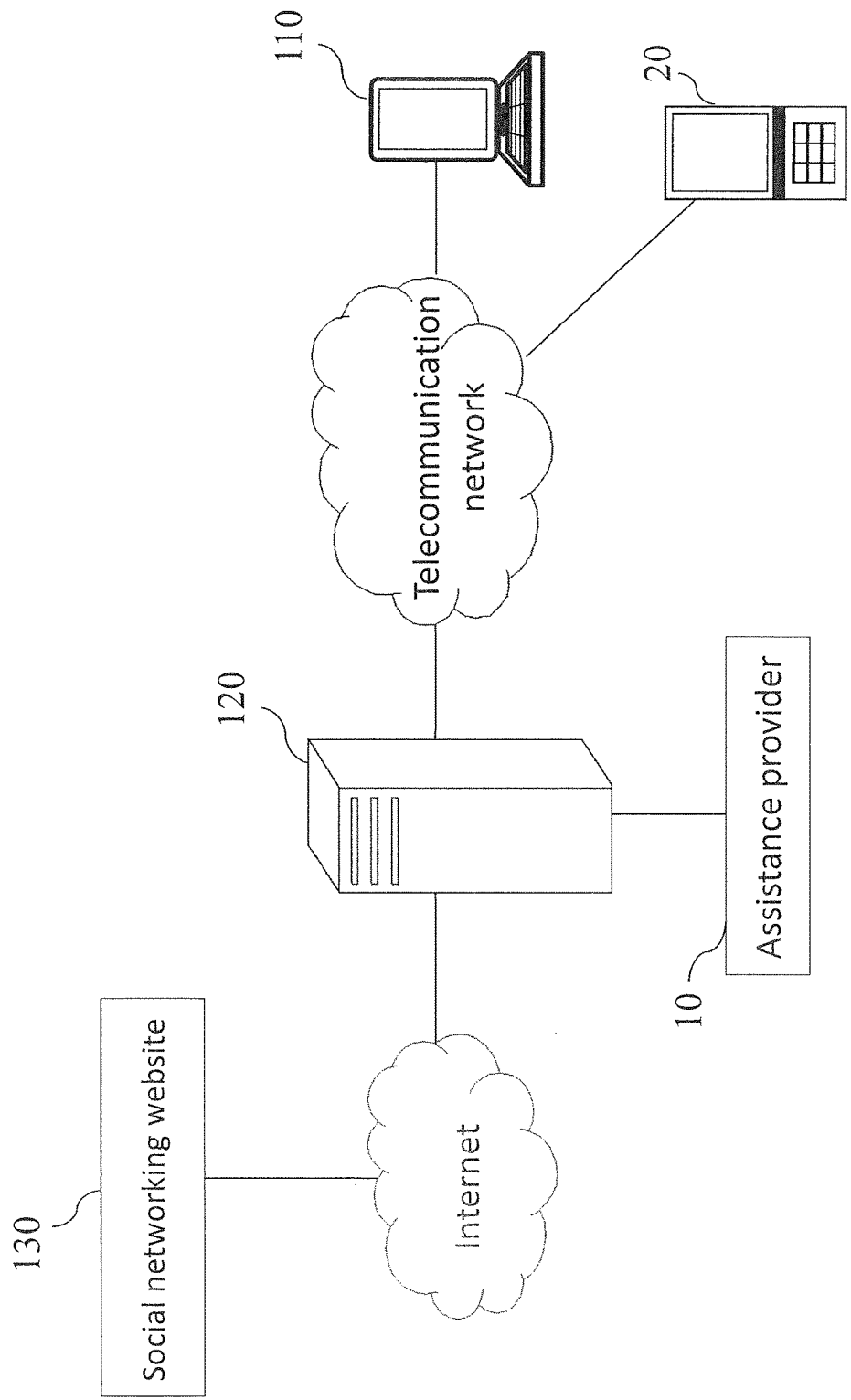
FIG. 1A is a schematic view showing a system for providing location-based assistance according to an embodiment of the present invention.
Figure 1B:
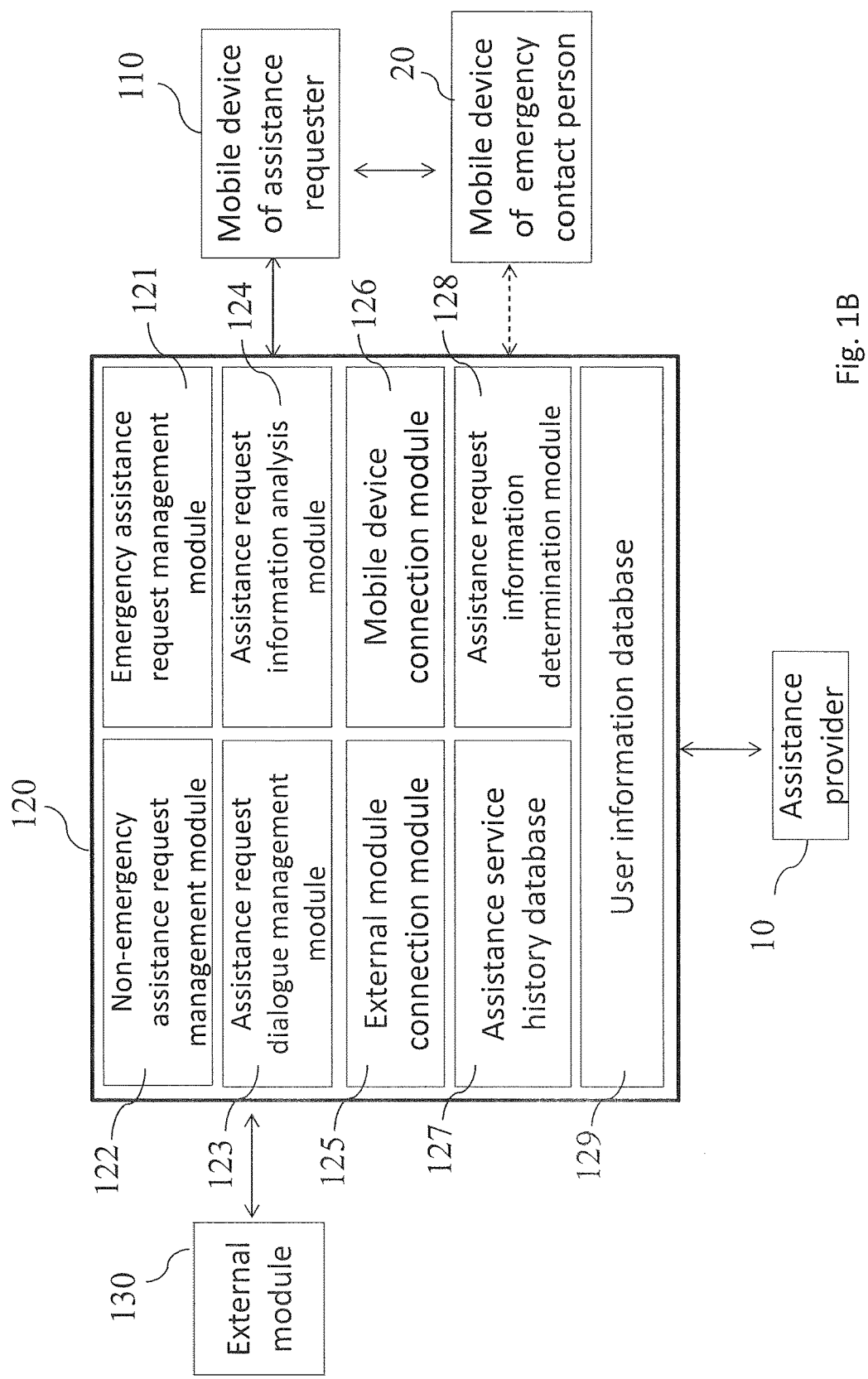
FIG. 1B is a block diagram showing the structure of the system for providing location-based assistance according to an embodiment of the present invention.
Figure 7:
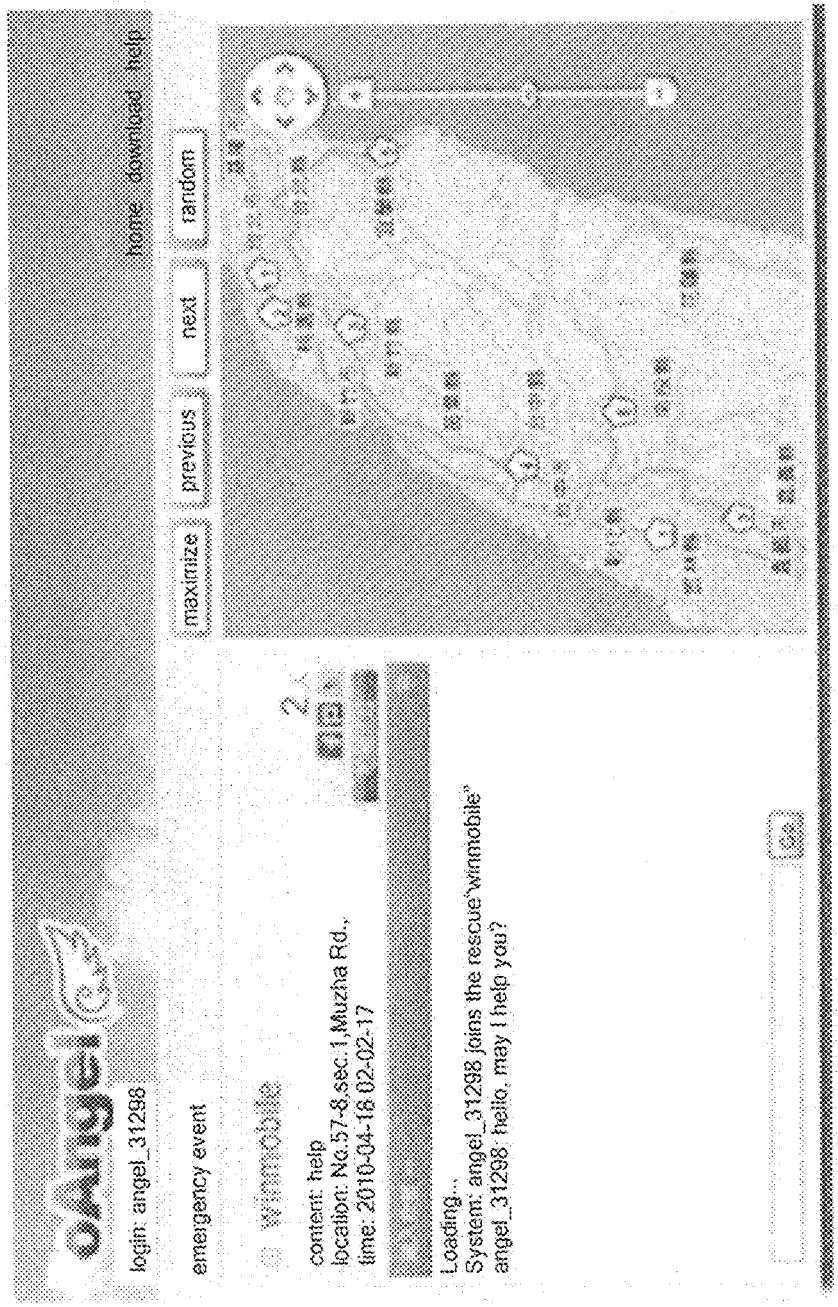
FIG. 7 is a representation of the screen display showing an assistance service list according to an embodiment of the present invention.

FIG. 1A is a schematic view showing a system for providing location-based assistance according to an embodiment of the present invention; FIG. 1B is a block diagram showing the structure of the system. In one embodiment of the present invention, a system for providing location-based assistance is employed to jointly provide assistance to an assistance requester having a mobile device 110. The system includes a server 120 of a joint assistance service provider. The server 120 is capable of communicating with the mobile device 110 as well as an external module 130. When the assistance requester needs to request assistance, the mobile device 110 can be used to execute an assistance request module to locate the assistance requester and generate information such as the requester's latitude and longitude coordinates; the assistance request information containing the assistance requester's location information is then transmitted to the server 120 of the joint assistance service provider. The server 120 receives the assistance request information and subsequently analyzes it to generate an assistance service list (as shown in FIG. 7) for providing further assistance-related data. The aforementioned assistance-related data contains information that is related to the assistance requester's location, such as maps of the location, route plans to the location for providing assistance, map search for the location's surrounding area, or assistance provision information search, so that the assistance provider 10 can provide assistance based on said data. In an embodiment of the present invention, the provider 10 may be a user accessing the server 120 or a user browsing the content of the server 120. As such, the requested assistance as defined in the present invention is not limited to emergency assistance; it may, in a broad meaning, include any assistance for required information. For example, the requester may inquire where the nearest gas station is, or whether there is a beef noodle soup house nearby.

Figure 4A:
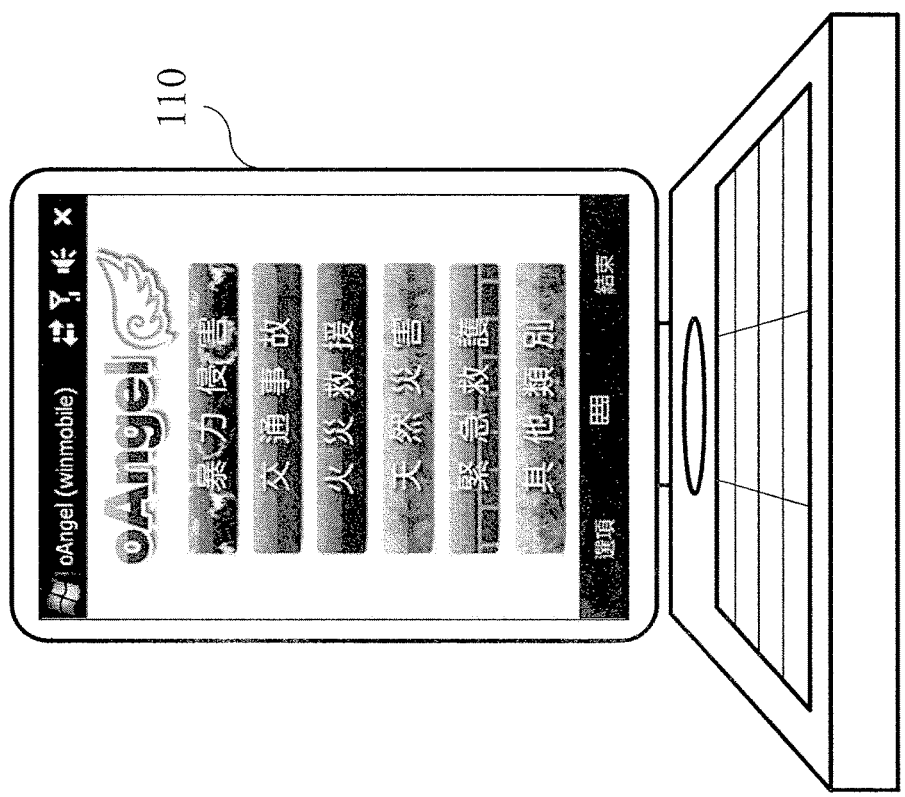
FIG. 4A is a representation of the screen display of an assistance requester's mobile device according to an embodiment of the present invention, showing the user interface for selecting the type of assistance from a menu bar.
Figure 4B:
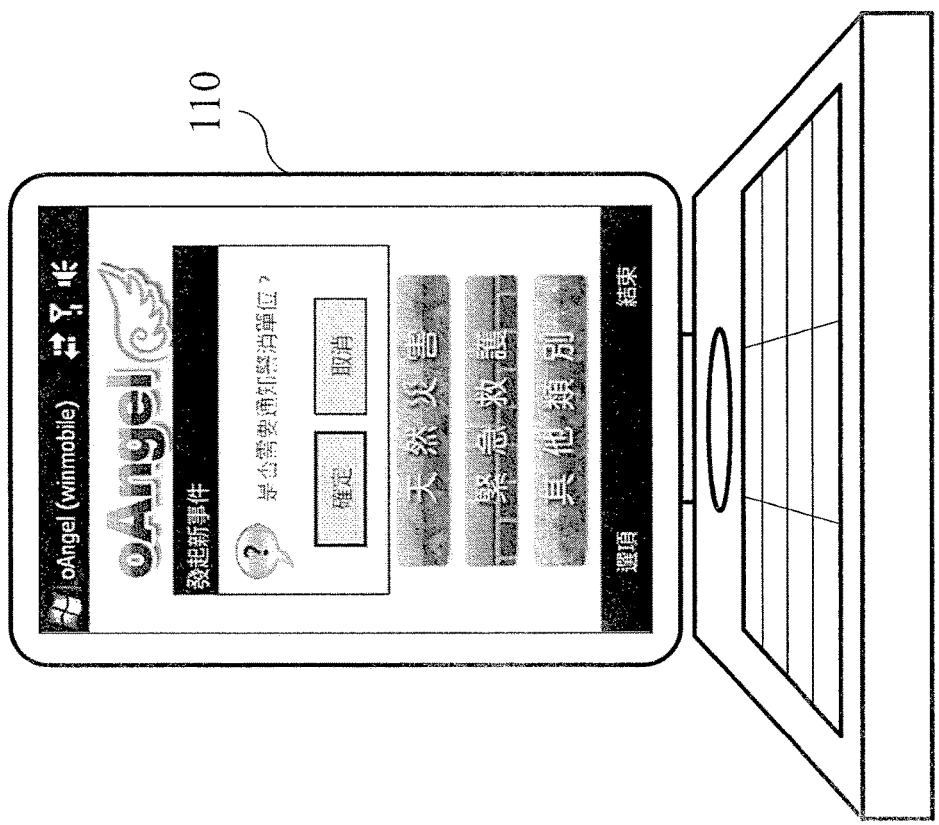
FIG. 4B is a representation of the screen display of an assistance requester's mobile device according to an embodiment of the present invention, showing the user interface for selecting the request transmission method.

In an embodiment of the present invention, an assistance request module needs to be installed on the mobile device 110 of the requester first; besides, the mobile device 110 is required to have a positioning function. When the assistance requester needs assistance, s/he can simply activate the assistance request module for execution by using a keyboard of the mobile device 110 to provide predetermined inputs. The predetermined inputs preset by the requester may be provided using a single function key or using a sequence of keys. When the assistance request module of the mobile device is activated for execution by a sequence of keyboard inputs, assistance request information containing the assistance requester's location information is transmitted to a server 120 of a joint assistance service provider. The assistance request module can determine the type of assistance request information that the requester is asking for by the sequence of keyboard inputs. It should be noted that the keyboard inputs are not limited to those provided through a physical keyboard of a mobile device, but may include those provided through a touch screen of a mobile device. For example, the assistance requester using a touch screen may select the type of assistance from a menu bar as shown in FIGS. 4A and 4B; by tapping a particular icon on the touch screen, the requester can start the execution of the assistance request module. For example, if the requester needs emergency assistance, s/he can press the keys #911# on the mobile device 110 in sequence, or alternatively, s/he can tap the "emergency assistance" icon from the menu bar shown on the touch screen, and the assistance request module will start execution and transmit assistance request information containing the assistance requester's location information to the server 120 of the joint assistance service provider. Different sequences of keyboard inputs are set to correspond to respective assistance request information; therefore, the requester's particular request can be sent to the server 120 for the assistance service provider to know what kind of assistance the requester needs.

In another embodiment of the present invention, an assistance requester wants to know whether there is a gas station nearby. The requester may, for example, select and tap a particular icon on the screen of the mobile device 110; the assistance request module will then start execution and transmit assistance request information containing the requester's location information to the server 120 of the joint assistance service provider. The server 120 thus receives this assistance request containing the information that the requester wants to search for a gas station nearby.

Figure 5A:
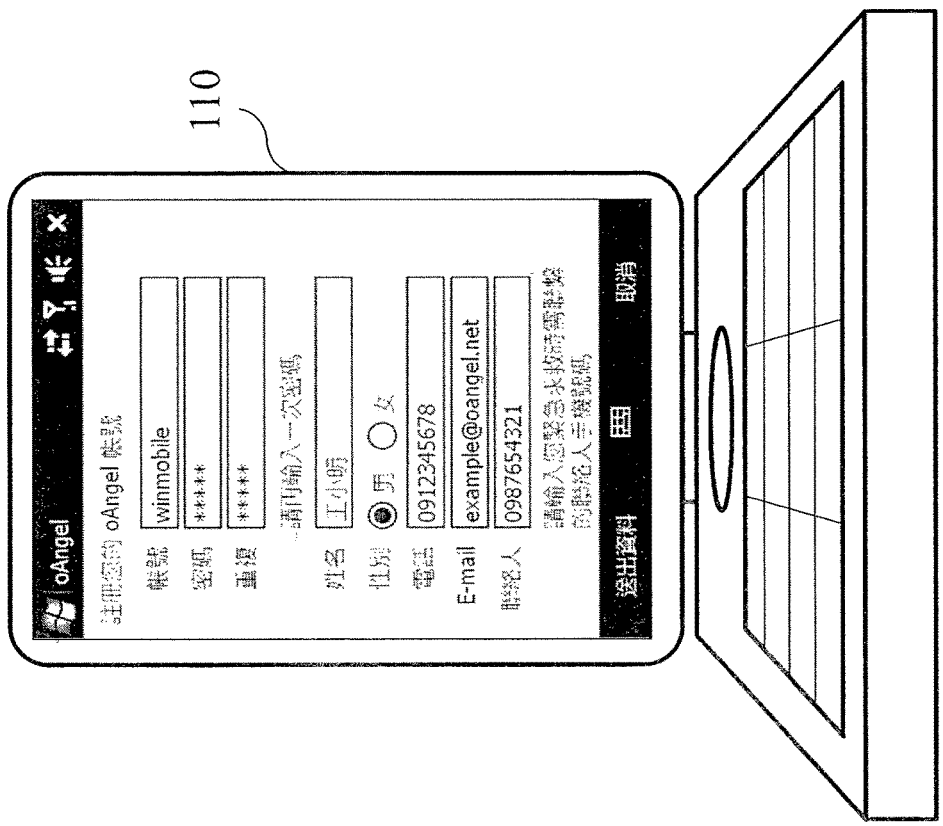
FIG. 5A is a representation of the screen display of an assistance requester's mobile device according to an embodiment of the present invention, showing the user interface for providing account information.
Figure 5B:
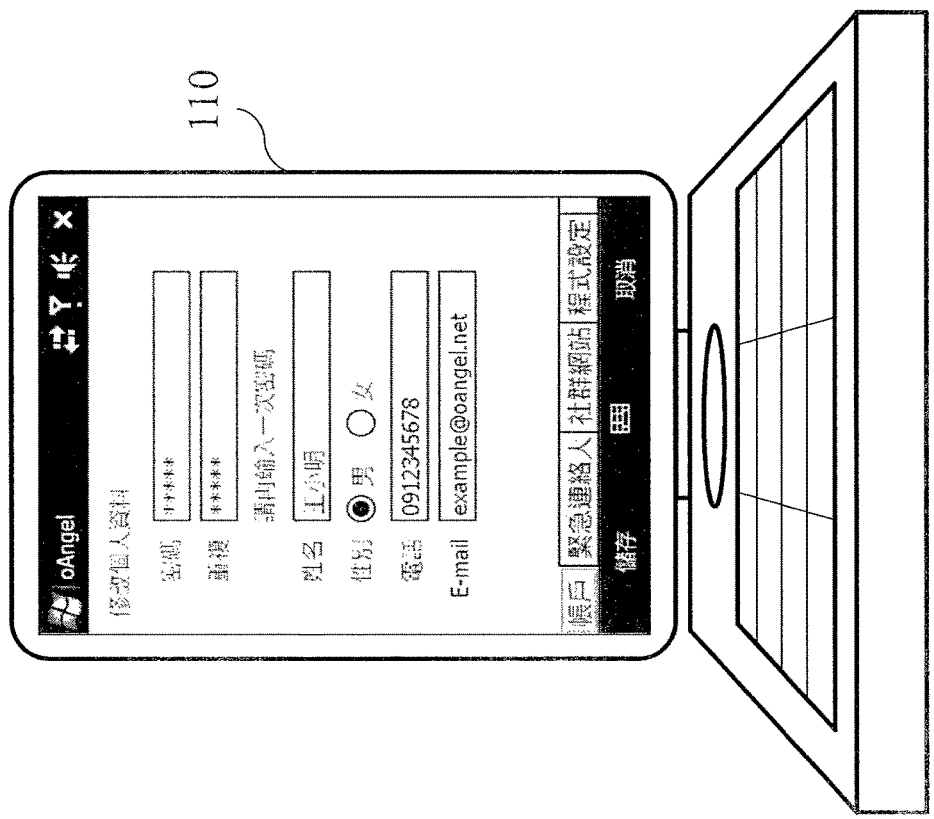
FIGS. 5B, 5C and 5D are representations of the screen display of an assistance requester's mobile device according to an embodiment of the present invention, showing the user interface for editing account settings and personal information.
Figure 5C:
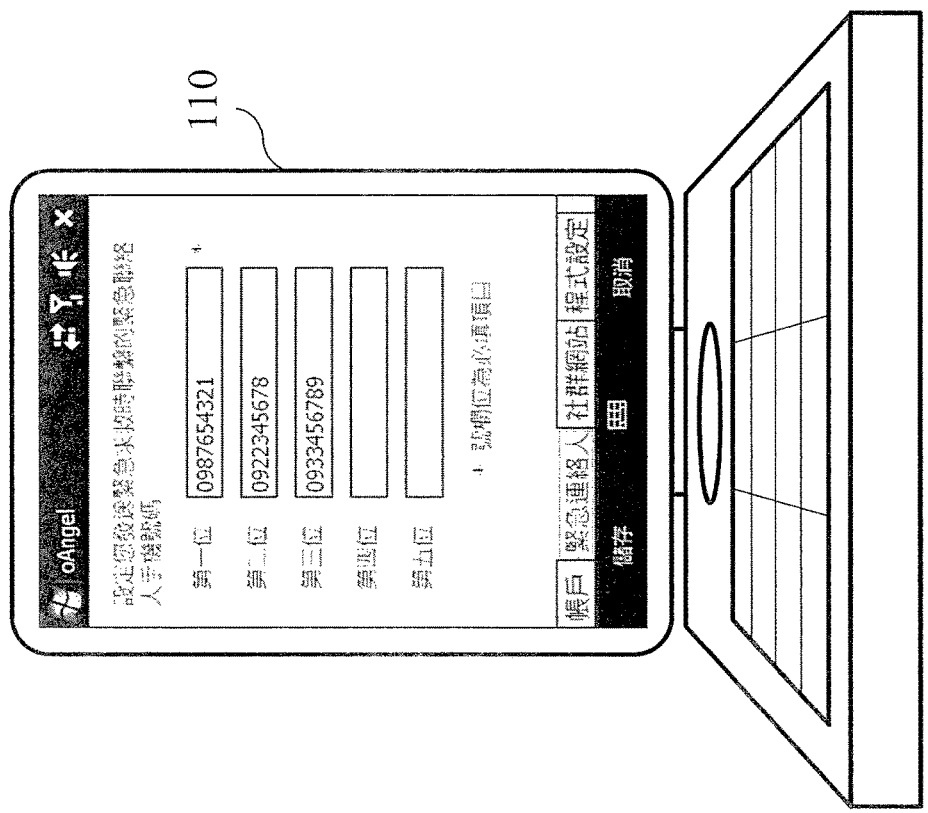
Figure 5D:
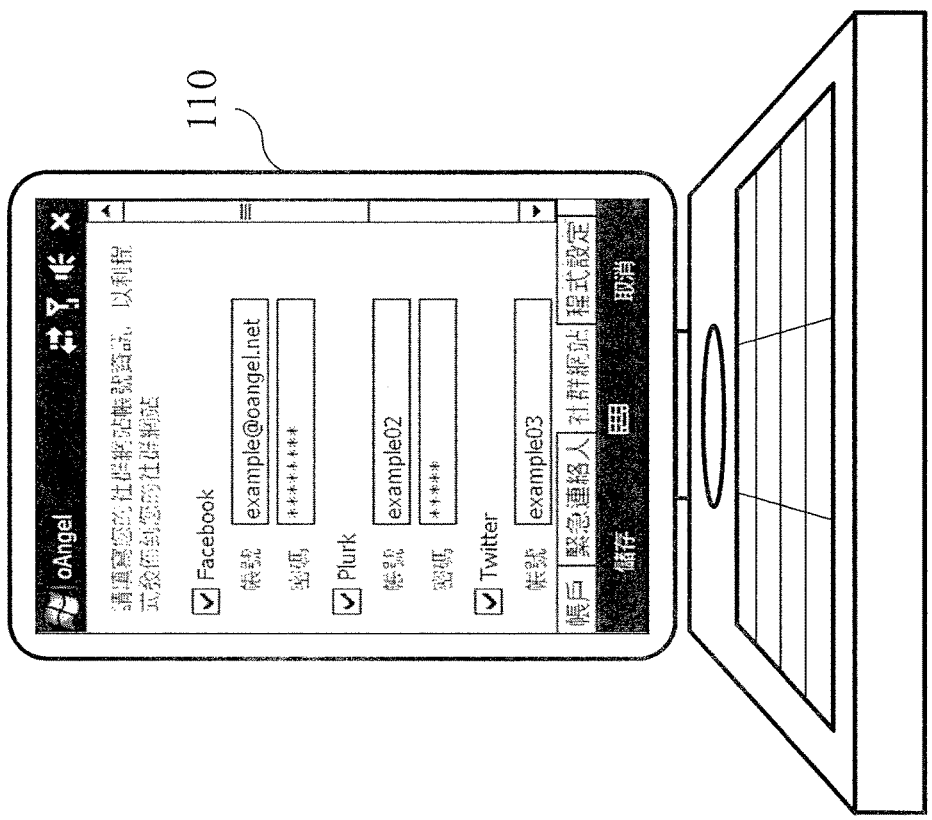

During the process of installing the assistance request module, the assistance requester needs to edit account settings to verify his/her identity and the identification number of the mobile device 110. For example, the assistance requester may need to edit information such as his/her account, password, name, phone number, social network account, instant messaging account, online discussion site user account, BBS user account, identification number of the mobile device owned by the emergency contact person (at least one number should be provided), etc. FIGS. 5A, 5B, 5C and 5D are representations of the screen display of an assistance requester's mobile device, showing the user interface for editing account settings and personal information. The assistance requester needs to first register an account using the user interface as shown in FIG. 5A. After that, s/he can use the user interface as shown in FIGS. 5B-5D to further edit the account settings and personal information. After the assistance requester finishes installation of the assistance request module, it is set to the "automatic login" mode; that is, when the mobile device 110 is turned on, the assistance request module will automatically log in the user, so that the assistance requester can execute the module at any time. After the assistance requester executes the assistance request module, the mobile device 110 will transmit assistance request information containing the assistance requester's location information to the server 120 of the joint assistance service provider. When editing the settings of the assistance request module, the assistance requester can assign different emergency levels to his/her assistance requests and set the method and frequency of transmitting the assistance request information. For example, the assistance requester may set that if the assistance request information is of an emergency type, it will be simultaneously transmitted to a mobile device 20 of an emergency contact person pre-specified by the assistance requester. Moreover, if the assistance request module detects that the sequence of keyboard inputs provided by the assistance requester to the mobile device 110 is of an emergency type, the assistance request module will execute a tracker program in the background to obtain location updates of the assistance requester and transmit updated assistance request information to the server 120 and the mobile device 20 of the emergency contact person.

In an embodiment of the present invention, after the assistance requester executes the assistance request module, it will start to locate the mobile device 110 to obtain the location information, such as the latitude and longitude coordinates of the mobile device 110. The mobile positioning techniques used on the mobile device may include GPS, A-GPS, Cell ID positioning and cell-based positioning, but are not limited to the above methods. After the process of locating the mobile device 110 finishes, the assistance request module will gather all the positioning data, the assistance requester's personal data, and other data related to providing assistance; the assistance request module then uses the gathered data to generate the assistance request information to be transmitted to the server 120, or further transmitted to the mobile device 20 of the emergency contact person. The assistance request information and a dynamic URL link can be transmitted from the mobile device 110 to the mobile device 20 of the emergency contact person or a social networking website 130 via a text message or a posting; the text message contains a dynamic URL link, so that the emergency contact person or a user of the social networking website 130 can click on the dynamic URL link to connect to the server 120. As a result, the emergency contact person or the user of the social networking website 130 can retrieve the assistance service list or obtain other assistance-related data from the server 120. Further, the user of the social networking website 130 may forward the posting to allow more users of the social networking website 130 to know that the assistance requester needs assistance. It should be noted that the assistance request information and the dynamic URL link transmitted from the mobile device 110 to the mobile device 20 of the emergency contact person or the social networking website 130, is either generated by the mobile device 110 itself or obtained from the server 120 of the joint assistance service provider.

In the above-mentioned embodiment, the server 120 of a joint assistance service provider comprises an emergency assistance request management module 121, a non-emergency assistance request management module 122, an assistance request dialogue management module 123, an assistance request information analysis module 124, an external module connection module 125, a mobile device connection module 126, an assistance service history database 127, an assistance request information determination module 128, and a user information database 129. In the embodiment, when the assistance requester uses the mobile device 110 to send out assistance request information, the server 120 of the joint assistance service provider receives the information through the mobile device connection module 126. The assistance request information determination module 128 of the server 120 then determines whether the request is an emergency assistance request or a non-emergency assistance request. If the request is for emergency assistance, it will be processed by the emergency assistance request management module 121, which will send out a message requesting high priority emergency assistance; if the request is for non-emergency assistance, it will be processed by the non-emergency assistance request management module 122. On the other hand, after the mobile device connection module 126 receives the assistance request information, the information will be sent to the assistance request information analysis module 124 at once to be processed and analyzed, so that the assistance requester's location information can be effectively utilized. For example, such information can be used to provide a dynamic display of maps showing the requester's location, provide a service for searching the maps of the requester's surrounding area, provide a route plan from the assistance provider's location to the requester's location, or provide other assistance-related data (such as the emergency report line number or website link directed to the Coast Guard Administration if a rescue on the sea is needed). For the assistance provider 10, the assistance request information analysis module 124 also generates an assistance service list showing all the available information for providing assistance, so that the assistance provider 10 can soon decide what to do based on the information.

In the above-mentioned embodiment, the server 120 of the joint assistance service provider connects to an external module 130 via the external module connection module 125. The external module 130 may be a social networking website (e.g. Facebook, Twitter, Plurk, Wretch, Pixnet, Xuite, etc.) on which the assistance requester or a person other than him/her has registered an account, an instant messaging service (e.g. Windows Live Messenger, Yahoo! Messenger, etc.), an online discussion site with message boards, a bulletin board system (BBS), or a widget. In an embodiment of the invention, as long as the assistance requester has logged in his/her account of the external module 130, the external module connection module 125 can transmit the assistance request information thereto. Alternatively, the external module connection module 125 can send a message to a widget, and the widget will notify the widget user in time; the message may contain a dynamic URL link, so that the widget user can click on it and connect to the server 120. In another embodiment, the external module 130 may be any public website that the server 120 of the joint assistance service provider can send assistance request information to. In an embodiment of the present invention, after the mobile device connection module 126 receives the assistance request information containing the assistance requester's location information, the mobile device connection module 126 may transmit the information directly to the external module connection module 125 to generate an assistance request message, and then the external module connection module 125 will transmit the assistance request message to the external module 130. Alternatively, the mobile device connection module 126 may, after receiving the assistance request information, transmit the information to the assistance request information determination module 128 and the assistance request information analysis module 124; after the determination and analysis process, an assistance service list is generated, and the content of the list is then processed for generating an assistance request message. The external module connection module 125 will then send the assistance request message to the external module 130, wherein the assistance request message shall be generated according to the content type offered by the external module 130. For example, if the external module 130 is a social networking website, a message (containing the assistance request information) which can be posted thereon will be generated. Accordingly, a user browsing the content of the external module 130 will be informed of the incident and can provide emergency assistance or further help; the user can also connect to the server 120 of the joint assistance service provider to find out or inquire assistance-related data.

Figure 6:
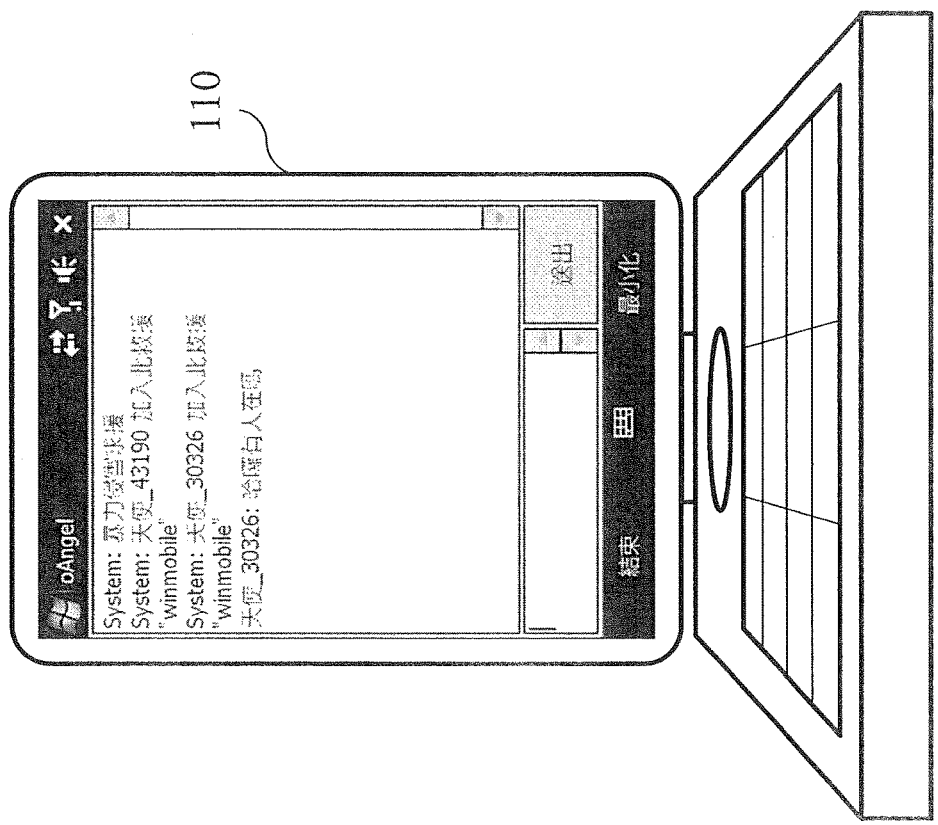
FIG. 6 is a representation of the screen display of an assistance requester's mobile device according to an embodiment of the present invention, showing the assistance request dialogue interface.

In the above-mentioned embodiment, the server 120 of the joint assistance service provider may also provide an assistance request dialogue interface through the assistance request dialogue management module 123, so that the assistance requester can communicate with the assistance provider 10 or with a user browsing the content of the external module 130. When the assistance requester has transmitted the assistance request information via the mobile device 110, and the assistance provider 10 or a user browsing the content of the external module 130 has thus been informed of the incident, the assistance provider 10 or a user browsing the content of the external module 130 can select one option shown on the assistance service list to request a dialogue with the assistance requester. After receiving this request, the server 120 will then provide an assistance request dialogue interface through the assistance request dialogue management module 123. As a result, data transmitted by the assistance provider 10 or a user browsing the content of the external module 130 can be forwarded by the assistance request dialogue management module 123 to the mobile device 110 of the assistance requester, using the mobile device connection module 126. On the other hand, the assistance requester can make a reply to the assistance provider 10 or a user browsing the content of the external module 130 through the assistance request dialogue interface. Thus, both sides can communicate with each other. FIG. 6 is a representation of the screen display of an assistance requester's mobile device, showing an example where the assistance requester is having a dialogue with the assistance provider 10 or a user browsing the content of the external module 130 through the assistance request dialogue interface.

In an embodiment of the present invention, the server 120 of the joint assistance service provider can record all the incidents related to assistance request and assistance provision to its assistance service history database 127 for future inquiries. Moreover, the server 120 can use the user information database 129 to store user information, including the assistance requester's personal information. When the assistance request information analysis module 124 needs to perform an analysis, the assistance service history database 127 or the user information database 129 of the server may provide data thereto.

In an embodiment of the present invention, the assistance request module installed in the mobile device 110 may have different versions. When the mobile device 110 connects to the server 120 of the joint assistance service provider and the server 120 receives no information regarding emergency assistance request, the server 120 will check the version of the assistance request module. If there is a newer version available, a notice will come up that inquires whether the mobile device 110 needs an updated version of the assistance request module. The mobile device 110 may connect to the server 120 via the Internet, wireless network or telecommunications network, such as GSM, Bluetooth, Wi-Fi, WiMAX, GPRS, 3G, 3.5G, etc. The server 120 may also connect to a social network (the external module) via the Internet, wireless network or telecommunications network.

In an embodiment of the present invention, the assistance provider 10 can select one of the options shown on the assistance service list to provide assistance provision information to the server 120; after collecting the information, the server 120 may further transmit it to integrate with the assistance-related data. Besides, a user of the external module 130 can provide assistance provision information to the server 120 via the external module connection module 125.

Figure 2:
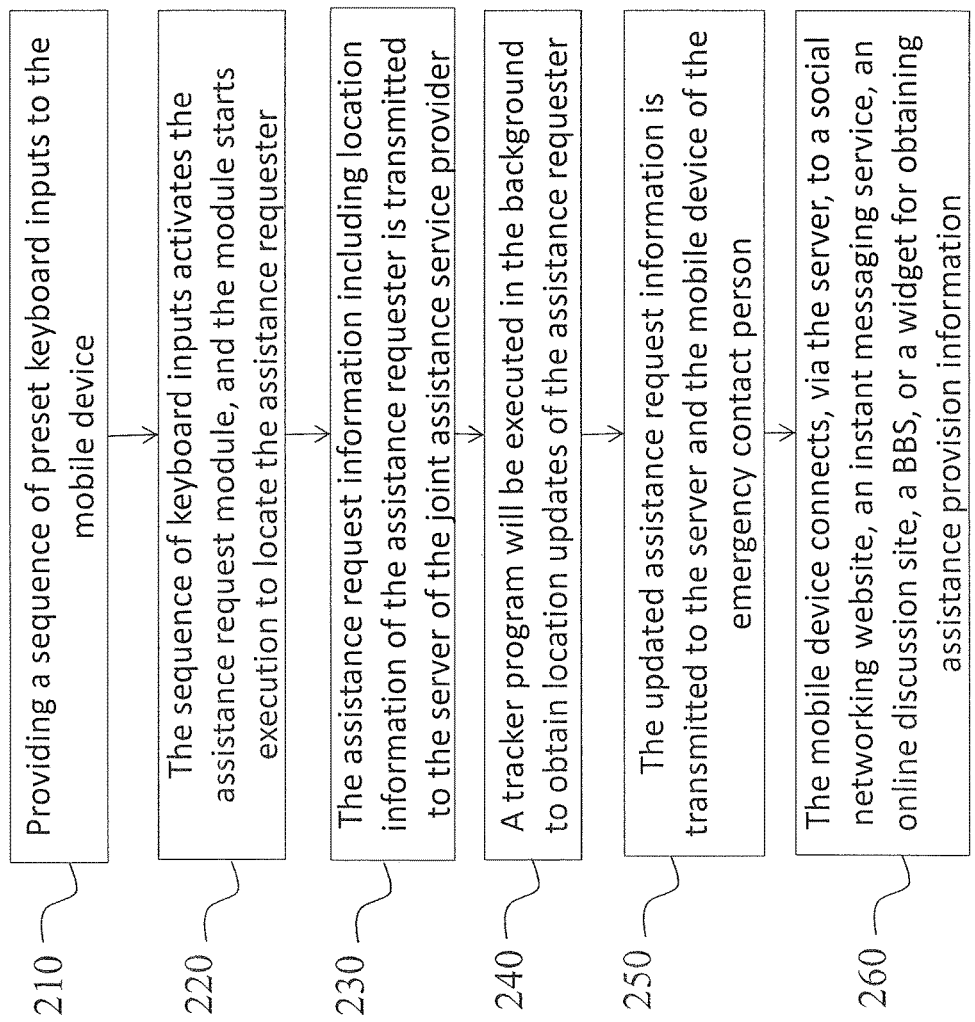
FIG. 2 is a flow chart showing a method for requesting location-based assistance according to an embodiment of the present invention.

FIG. 2 is a flow chart showing a method for requesting location-based assistance according to an embodiment of the present invention. Any assistance requester having a mobile device can use this method when s/he needs assistance. In an embodiment of the present invention, before applying this method, the assistance requester needs to install an assistance request module in the mobile device first. Moreover, after installation, the assistance requester needs to edit the module settings to provide personal information used for assistance request and provision; personal information may include an account for using the module, password, name, phone number, e-mail address, social network account, instant messaging account, online discussion site user account, BBS user account, identification number of the mobile device owned by the emergency contact person, etc. After the assistance requester successfully installs the assistance request module into the mobile device, the module is set to the "automatic login" mode; that is, when the mobile device is turned on, the module will automatically log in the user, so that the assistance requester can execute the module at any time. When the assistance requester executes the assistance request module, the mobile device will transmit the assistance requester's information to the server of a joint assistance service provider. The assistance requester can also set the method and frequency of transmitting the assistance request information, or alternatively use the default setting. For example, the assistance requester may set that if the assistance request information is of an emergency type, it will be transmitted via a text message every 10 minutes, or further, it will be simultaneously transmitted to the mobile device of the emergency contact person pre-specified by the assistance requester. Moreover, if the assistance request module detects that the sequence of keyboard inputs provided by the assistance requester to the mobile device is of an emergency type, the assistance request module will execute a tracker program in the background to obtain location updates of the assistance requester and transmit updated assistance request information to the server and the mobile device of the emergency contact person. The assistance requester can use a simple set of keyboard inputs, which may be in sequence, to activate the mobile device's assistance request module for execution.

With reference to FIG. 2, when the assistance requester needs to request assistance, s/he provides a sequence of preset keyboard inputs to the mobile device, as shown in step 210. In step 220, the sequence of keyboard inputs activates the assistance request module; thus, the module starts execution to locate the assistance requester and then gathers all the positioning data, the assistance requester's personal data, a hyperlink directed to the server 120 of the joint assistance service provider, and other data related to providing assistance to generate the assistance request information. The positioning techniques used in this step may include GPS, A-GPS, Cell ID positioning and cell-based positioning, but are not limited to the above methods. Then in step 230, the assistance request information is transmitted to the server of the joint assistance service provider, wherein the server comprises an external module connection module to post the assistance request information. The server may further transmit the assistance request information to the mobile device of the emergency contact person pre-specified by the assistance requester, so that a user of the server and the emergency contact person can both be informed of the incident. The method and frequency of transmitting the assistance request information is in accordance with the assistance requester's settings. For example, the assistance requester may have set that, if the assistance request information is of an emergency type, it will be transmitted to the mobile device of the emergency contact person via a text message. And the text message contains a dynamic URL link, so that the emergency contact person can connect to the server to retrieve the location information of the assistance requester or obtain other assistance-related data. Also, as shown in step 240, if the assistance request information is of an emergency type, a tracker program will be executed in the background to obtain location updates of the assistance requester. In step 250, the updated assistance request information is transmitted to the server and the mobile device of the emergency contact person. Then in step 260, after the assistance request information is received by the server, the mobile device connects, via the server, to a social networking website, an instant messaging service, an online discussion site, a BBS, or a widget for obtaining assistance provision information; the social networking website may be one on which the assistance requester or a person other than him/her has registered an account. In an embodiment of the present invention, the assistance requester's location information is being continuously updated, and the updated assistance request information is being continuously transmitted to the server and the emergency contact person. The updated assistance request information is further forwarded to the social networking website, instant messaging service, online discussion site, BBS, or widget, so that their users can be informed of the latest updates of the assistance request's location to know about his/her movement. However, when applying the method for requesting location-based assistance of the present invention as described above, the order of the steps are interchangeable; the steps may occur concurrently, and the step order may be altered.

Figure 3:
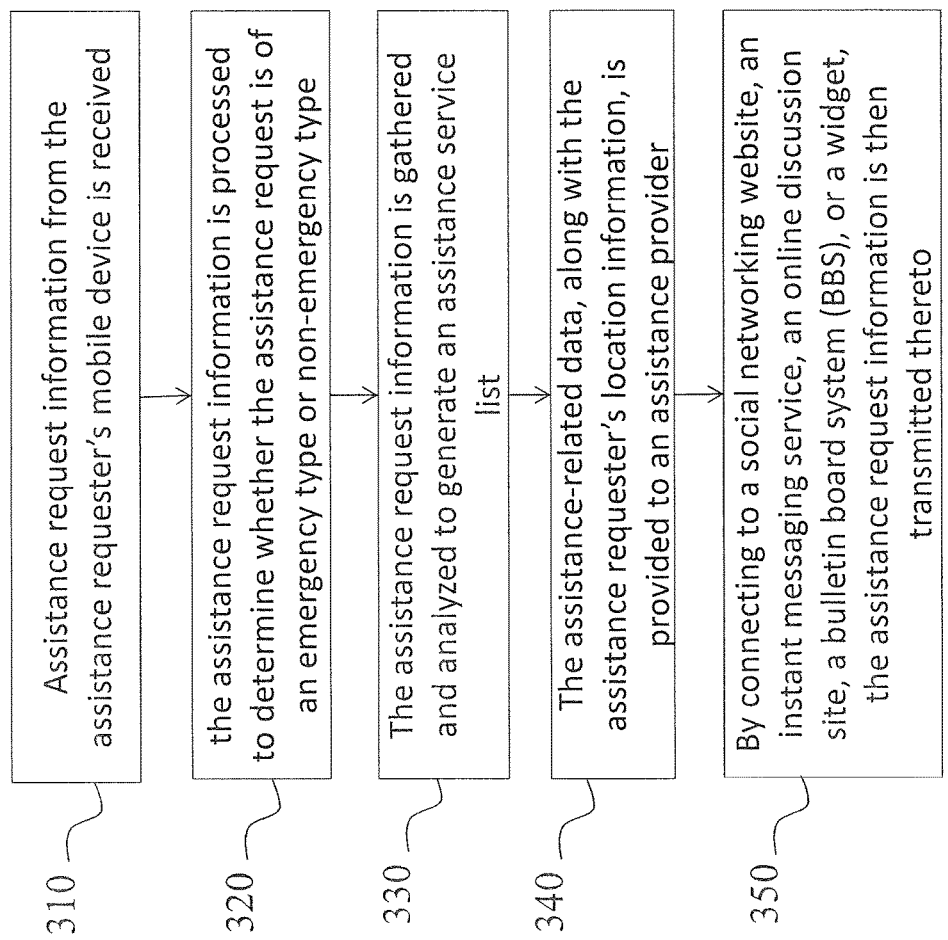
FIG. 3 is a flow chart showing a method for providing location-based assistance according to an embodiment of the present invention.

FIG. 3 is a flow chart showing a method for providing location-based assistance according to an embodiment of the present invention, wherein the method includes the following steps. In step 310, assistance request information from the assistance requester's mobile device is received; the assistance request information contains the assistance requester's location information. Then in step 320, the assistance request information is processed to determine whether the assistance request is of an emergency type or non-emergency type; if the request is for emergency assistance, it will be processed with high priority. In step 330, the assistance request information is gathered and analyzed to generate an assistance service list, which utilizes the assistance requester's location information to give assistance provision plans and contains assistance-related data. Then in step 340, the assistance-related data, along with the assistance requester's location information, is provided to an assistance provider; the assistance-related data may contain maps of the assistance requester's location, route plans for assistance provision, surrounding area map search, or assistance provision information search. For example, the information can be used to provide a dynamic display of maps showing the requester's location, provide a service for searching the maps of the requester's surrounding area, provide a route plan from the assistance provider's location to the requester's location, or provide other assistance-related data. As such, the assistance provider can, through the assistance service list, quickly obtain all the detailed information related to assistance provision; this can help speed up the process for providing assistance. In step 350, by connecting to a social networking website, an instant messaging service, an online discussion site, a bulletin board system (BBS), or a widget, the assistance request information is then transmitted thereto; the social networking website may be one on which the assistance requester or a person other than him/her has registered an account. Furthermore, the assistance requester may obtain real-time assistance provision information via his/her mobile device. The method for providing location-based assistance of this invention further includes: providing an assistance request dialogue interface for the assistance requester to communicate with the assistance provider or a user browsing content of the social networking website, the instant messaging service, the online discussion site, the bulletin board system, or the widget. After the assistance requester transmits the assistance request information through the mobile device, the assistance provider or the user browsing content of the social networking website, the instant messaging service, the online discussion site, the bulletin board system, or the widget, who is informed of the incident, can select one option shown on the assistance service list to request a dialogue with the assistance requester. Thereafter, the assistance request dialogue management module can forward the data transmitted by the assistance provider or the user browsing content of the social networking website, the instant messaging service, the online discussion site, the bulletin board system, or the widget to the assistance requester's mobile device; on the other hand, the assistance requester can make a reply back so that both sides can communicate with each other. The method for providing location-based assistance of this invention further includes: receiving updated assistance request information continuously, wherein the updated assistance request information contains the updated information about the assistance requester's location. By having the two-way communication and continuously receiving the updated assistance request information, the assistance provider or the user browsing content of the social networking website, the instant messaging service, the online discussion site, the bulletin board system, or the widget can know about the assistance requester's latest information regarding his/her location and assistance request. This will help speed up the process for providing assistance. However, when applying the method for providing location-based assistance of the present invention as described above, the order of the steps are interchangeable; the steps may occur concurrently, and the step order may be altered.

A method for requesting and providing location-based assistance according to the present invention is not limited to emergency assistance, but can also be applied to non-emergency assistance. For example, it can be applied to the commonly-used knowledge Q&A service, where a user browsing content of the server of a joint assistance service provider, the social networking website, the instant messaging service, the online discussion site, the bulletin board system, or the widget can use this method to provide assistance; the user can also use an assistance request dialogue interface described above to have two-way communication with the assistance requester.

While this invention has been described by way of examples and in terms of preferred embodiments, it is to be understood that this invention is not limited hereto, and that various changes and modifications can be made by those skilled in the art without departing from the spirit and scope of this invention. It is intended that the scope of the invention be defined by the claims appended hereto.

What is claimed is:

1. A method for requesting location-based assistance executed on a mobile device of an assistance requester, including the following steps:
    executing an assistance request module of the mobile device to obtain information on the assistance requester's location; and
    transmitting assistance request information including the assistance requester's location information and an assistance service selected by the assistance requester to a server of a joint assistance service provider, the server analyzing the assistance request information and generating an assistance service list containing assistance-related data that is related to the assistance requester's location information based on the assistance request information;
    wherein at least one user of a social media receives a notification including the assistance request information for enabling the at least one user of the social media to connect to the server for obtaining the assistance service list and to provide assistance based on the assistance service list; and
    wherein a frequency of said transmitting the assistance request information is in accordance with the assistance requester's settings or an emergency level of the assistance service.

2. The method according to claim 1, wherein the notification is transmitted by the mobile device and includes the assistance request information and a dynamic URL link for enabling the at least one user of the social media to connect to the server for obtaining the assistance service list and to provide assistance based on the assistance service list.

3. The method according to claim 1, wherein the notification is transmitted by the server and includes the assistance request information and a dynamic URL link for enabling the at least one user of the social media to connect to the server for obtaining the assistance service list and to provide assistance based on the assistance service list.

4. The method according to claim 1, further including: transmitting the notification including the assistance request information and a dynamic URL link to a mobile device of an emergency contact person pre-specified by the assistance requester for enabling the emergency contact person to connect to the server for obtaining the assistance service list and to provide assistance based on the assistance service list.

5. The method according to claim 1, wherein an assistance provider connects to the server for obtaining the assistance service list and provides assistance based on the assistance service list.

6. The method according to claim 1, wherein the social media includes a social networking website, an instant messaging service, an online discussion site, a bulletin board system (BBS), or a widget.

7. The method according to claim 1, 2, 3, 4 or 5, wherein the server executes an assistance request dialogue management module to enable the at least one user of the social media, the emergency contact person or the assistance provider to carry out a two-way dialogue with the assistance requester via the server and via an assistance request dialogue interface displayed on the mobile device, and to provide assistance based on the assistance service list.

8. The method according to claim 1, wherein the assistance request information is assigned an emergency level and the server determines whether the assistance request information is an emergency assistance request or a non-emergency assistance request.

9. The method according to claim 1, further including: executing a tracker program in the background to obtain location updates of the assistance requester and transmitting updated assistance request information.

10. The method according to claim 1, wherein the assistance-related data contains maps of the assistance requester's location, route plans for assistance provision, surrounding area map search, or assistance provision information search.

11. The method according to claim 1, wherein the location-based assistance having a plurality of different types, and the assistance request module activated via a touchscreen or keyboard of the mobile device by selecting a respective one of said different types of location-based assistance upon pressing a preset function key displayed on said touchscreen or a preset sequence of keys of said keyboard.

12. A method for providing location-based assistance executed on a server of a joint assistance service provider, including the following steps:
    receiving assistance request information from a mobile device of an assistance requester, the assistance request information including the assistance requester's location information and an assistance service selected by the assistance requester, wherein the assistance requester's location information is obtained by executing an assistance request module of the mobile device; and
    analyzing the assistance request information and generating an assistance service list containing assistance-related data that is related to the assistance requester's location information based on the assistance request information; and
    wherein at least one user of a social media receives a notification including the assistance request information for enabling the at least one user of the social media to connect to the server for obtaining the assistance service list and to provide assistance provision information based on the assistance service list;
    wherein a frequency of transmitting the assistance request information is in accordance with the assistance requester's settings.

13. The method according to claim 12, wherein the notification is transmitted by the mobile device and includes the assistance request information and a dynamic URL link for enabling the at least one user of the social media to connect to the server for obtaining the assistance service list and to provide assistance based on the assistance service list.

14. The method according to claim 12, wherein the notification is transmitted by the server and includes the assistance request information and a dynamic URL link for enabling the at least one user of the social media to connect to the server for obtaining the assistance service list and to provide assistance based on the assistance service list.

15. The method according to claim 12, further including: transmitting the notification including the assistance request information and a dynamic URL link to a mobile device of an emergency contact person pre-specified by the assistance requester for enabling the emergency contact person to connect to the server for obtaining the assistance service list and to provide assistance based on the assistance service list.

16. The method according to claim 12, wherein an assistance provider connects to the server for obtaining the assistance service list and provides assistance based on the assistance service list.

17. The method according to claim 12, wherein the social media includes a social networking website, an instant messaging service, an online discussion site, a bulletin board system (BBS), or a widget.

18. The method according to claim 12, 13, 14, 15 or 16, further executing an assistance request dialogue management module to enable the at least one user of the social media, the emergency contact person or the assistance provider to carry out a two-way dialogue with the assistance requester via the server and via an assistance request dialogue interface displayed on the mobile device, and to provide assistance based on the assistance service list.

19. The method according to claim 12, wherein the assistance-related data contains maps of the assistance requester's location, route plans for assistance provision, surrounding area map search, or assistance provision information search.

20. The method according to claim 12, wherein the assistance request information is assigned an emergency level and the server determines whether the assistance request information is an emergency assistance request or a non-emergency assistance request.

21. The method according to claim 12, wherein the location-based assistance having a plurality of different types, and the assistance request module activated via a touchscreen or keyboard of the mobile device by selecting a respective one of said different types of location-based assistance upon pressing a preset function key displayed on said touchscreen or a preset sequence of keys of said keyboard.

* * * * *